(12) United States Patent
Tv

(10) Patent No.: US 12,159,135 B2
(45) Date of Patent: Dec. 3, 2024

(54) MACHINE LEARNING-BASED TARGET SIMULATOR

(71) Applicant: SAP SE, Walldorf (DE)

(72) Inventor: Ramalingam Tv, Calgary (CA)

(73) Assignee: SAP SE, Walldorf (DE)

( * ) Notice: Subject to any disclaimer, the term of this patent is extended or adjusted under 35 U.S.C. 154(b) by 109 days.

(21) Appl. No.: 17/991,507

(22) Filed: Nov. 21, 2022

(65) Prior Publication Data

US 2024/0168753 A1    May 23, 2024

(51) Int. Cl.
| | |
|---|---|
| *G06F 9/44* | (2018.01) |
| *G06F 3/0482* | (2013.01) |
| *G06F 8/65* | (2018.01) |
| *G06F 8/71* | (2018.01) |
| *G06F 9/445* | (2018.01) |
| *G06F 9/455* | (2018.01) |

(52) U.S. Cl.
CPC .............. *G06F 8/71* (2013.01); *G06F 3/0482* (2013.01); *G06F 8/65* (2013.01)

(58) Field of Classification Search
CPC ............. G06F 8/65; G06F 8/71; G06F 3/0482
See application file for complete search history.

(56) References Cited

U.S. PATENT DOCUMENTS

| | | | | |
|---|---|---|---|---|
| 10,754,638 | B1* | 8/2020 | Dwivedi | ............ G06F 16/9038 |
| 10,838,712 | B1* | 11/2020 | Mukhopadhyay | ........ G06F 8/61 |
| 12,038,477 | B1* | 7/2024 | Saba | ...................... G06N 20/00 |
| 2021/0334593 | A1* | 10/2021 | Vo | ............................. G06N 7/01 |
| 2021/0342738 | A1* | 11/2021 | Sarferaz | ................ G06Q 10/10 |
| 2022/0091726 | A1* | 3/2022 | Azmoon | ............... G06N 20/00 |
| 2023/0108015 | A1* | 4/2023 | Mayer | .................. G06V 30/153 |
| | | | | 704/9 |

(Continued)

FOREIGN PATENT DOCUMENTS

| | | | | |
|---|---|---|---|---|
| CN | 110785736 | A | * 2/2020 | ............. G06F 8/34 |
| CN | 113805883 | A | * 12/2021 | ............ G06F 8/313 |
| CN | 114254594 | A | * 3/2022 | |

OTHER PUBLICATIONS

Nan Wu, A Survey of Machine Learning for Computer Architecture and Systems, 2021, pp. 1-37. https://arxiv.org/pdf/2102.07952 (Year: 2021).*

(Continued)

*Primary Examiner* — Mongbao Nguyen
(74) *Attorney, Agent, or Firm* — SCHWEGMAN LUNDBERG & WOESSNER, P.A.

(57) ABSTRACT

In an example embodiment, machine learning techniques are utilized to create virtual tables that connect to actual tables in a user's own system. The virtual table predicts how the user's data can be used to populate fields in newer versions of software that the user already runs, even when those fields are not present in the version that the user already runs. These tables may then be used in a specialized tool, which displays in one area of the display a screen of the version of the software that the user is currently running ("the existing version") and displays in another area of the display a screen of the version of the software that the user is comparing to the existing version. Both display areas display the same screen, as rendered by their respective different versions of the software, using the same underlying base data.

20 Claims, 5 Drawing Sheets

(56) References Cited

U.S. PATENT DOCUMENTS

| | | | | |
|---|---|---|---|---|
| 2023/0139783 A1* | 5/2023 | Garib | ..................... | G06N 3/044 |
| | | | | 707/769 |
| 2023/0244361 A1* | 8/2023 | Mody | ................... | G06F 3/0481 |
| | | | | 715/781 |
| 2023/0376305 A1* | 11/2023 | Koneru | ..................... | G06F 8/71 |
| 2024/0086567 A1* | 3/2024 | Garg | ........................ | G06F 8/65 |
| 2024/0086867 A1* | 3/2024 | Miller | ............. | G06Q 10/06315 |

OTHER PUBLICATIONS

Arjan (CN 113805883 A), 2021, pp. 1-24. (Year: 2021).*
Mohamed Trabelsi, Semantic Labeling Using a Deep Contextualized Language Model, 2020, 1-10. chrome-extension://efaidnbmnnnibpcajpcglclefindmkaj/https://arxiv.org/pdf/2010.16037 (Year: 2020).*

\* cited by examiner

FIG. 2

MACHINE LEARNING-BASED TARGET SIMULATOR

BACKGROUND

Software is evolving every day. Newer versions arrive more frequently than ever, which presents a challenge for customers in that they often must decide whether a newer product version is the best version for their needs. Customers often must staff a consultant to try out new version and/or spend time watching product videos. Both of these scenarios, however, involve observing functioning of the new version on data that is not relevant to the customer.

BRIEF DESCRIPTION OF DRAWINGS

The present disclosure is illustrated by way of example and not limitation in the figures of the accompanying drawings, in which like references indicate similar elements.

FIG. 2 is an example depicting a screen of a graphical user interface (GUI), in accordance with an example embodiment.

DETAILED DESCRIPTION

Figure 1:
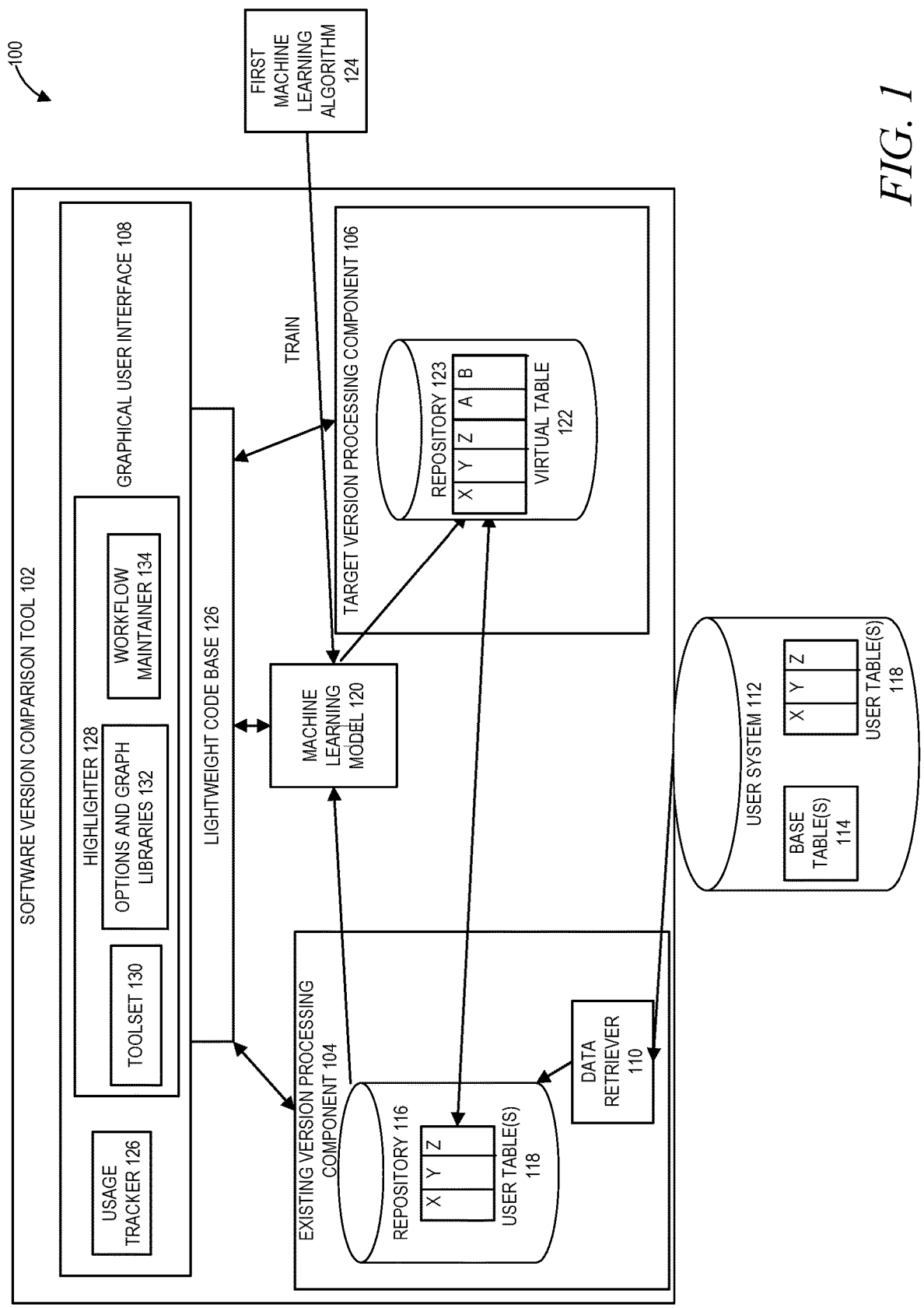
FIG. 1 is a block diagram illustrating a system, in accordance with an example embodiment.

The description that follows discusses illustrative systems, methods, techniques, instruction sequences, and computing machine program products. In the following description, for purposes of explanation, numerous specific details are set forth in order to provide an understanding of various example embodiments of the present subject matter. It will be evident, however, to those skilled in the art, that various example embodiments of the present subject matter may be practiced without these specific details.

In an example embodiment, machine learning techniques are utilized to create virtual tables that connect to actual tables in a user's own system. The virtual table predicts how the user's data can be used to populate fields in newer versions of software that the user already runs, even when those fields are not present in the version that the user already runs. These tables may then be used in a specialized tool, which displays in one area of the display a screen of the version of the software that the user is currently running (here referred to as "the existing version") and displays in another area of the display a screen of the version of the software that the user is comparing to the existing version (here referred to as "the target version"). Both display areas display the same screen, as rendered by their respective different versions of the software, using the same underlying base data (although the screen for the target version of the software obtains its data from the virtual table while the screen for the existing version of the software obtains its data from the original base table(s).

More particularly, the user selects a specific product. Optionally, the user may also choose a list of processes that they are interested in sampling. Each product allows users to run various processes. Each of these processes is a collection of related, structured activities or tasks. In the existing version of the software, there are one or more base tables that contain information that is useful for many different pieces of software. For confidentiality, security, and/or legal purposes, however, the user may not want to allow data from these base tables to be stored by the newer version of the software. Thus, machine learning techniques are used to create the virtual table.

The machine learning model gathers up the selected processes, underlying database tables/artifacts, any custom table the user has created in the existing version of the software, and usage information regarding usage of the existing version of the software (e.g., which screens the user navigated to and which commands the user executed on those screens), and uses all of this information to create one or more virtual tables connected to the base tables for each of the one or more specified business processes. For example, if there is a feature in the business process that points to a field of a base table, then a virtual table is created having a field pointing to that field of the base table, and the feature in the target version will point to the virtual table. The virtual tables can be named in accordance with a naming conversion (such as [process], [application]).

The machine learning model may be trained by a machine learning algorithm using a table that logs all the details of the actual base table used during a business process, the identification of the tables, usage patterns (e.g., frequently used fields and/or tables), and processes.

The virtual tables are connected to a GUI for the target version. Once the GUI is closed, then the virtual tables connected to that GUI are automatically deleted.

The screen of a GUI combines the GUI of the existing version of the software with the GUI for the target version. In an example embodiment, the existing version of the software is displayed on the left side of the screen while the target version of the software is displayed on the right side of the screen. A drop-down user interface element is provided on the right side of the screen for the user to select the target version from a plurality of possible target versions of the software. It should be noted that while in most cases the possible target versions of the software are newer versions than the existing version, in some example embodiments, one or more of the possible target versions may be versions of the software older than the existing version, such as if the user may want to consider downgrading to an earlier version that perhaps handles a particular process better.

The right side of the screen displays the results of processes and/or selections in the target version of the software, using the same underlying data (as obtained from the virtual table(s)) as the left side of the screen uses to display the results of processes and/or selections in the existing version of the software. This allows the user to sample how the target version of the software will operate using the user's own data.

In a further example embodiment, details about feature changes from the existing version of the software to the target version of the software can be highlighted on the right side of the screen in the portion of the GUI that displays the results of processes and/or selections in the target version of the software. This highlighting may either be literal highlighting (e.g., rendering the changed feature in a different color, such as bright yellow) or figurative highlighting (e.g., launching a details pane, tool tip, or customizable display area).

FIG. 1 is a block diagram illustrating a system 100, in accordance with an example embodiment. More particularly, a software version comparison tool 102 is provided. The software version comparison tool 102 includes an existing version processing component 104, a target version processing component 106, and a GUI 108. The GUI 108 may render a screen that allows a user to select a software product whose versions the user wants to compare, as well as select one or more processes of the software product to compare execution and results. The GUI 108 also renders a user interface element, such as a drop-down user interface element, on a display of a user, such that the user may use the user interface element to select a target version of a software product. The user may already own, or have otherwise acquired access and/or use rights, to an existing version of the software product. The user interface element may be, for example, a drop-down user interface element that allows the user to select from versions of the software product available to the software version comparison tool 102 that differ from the existing version of the software product.

Based on the user's selection of the software product and one or more processes, a data retriever 110 within the software version comparison tool 102 may retrieve data that will be used to execute the one or more processes in an existing version of the software product from a user system 112. The existing version of the software product may be determined automatically, by examining the operation of the user system 112 or by examining one or more base tables 114 to determine what version is installed, or may alternatively be explicitly provided by the user.

In an example embodiment, the user system 112 is Enterprise Resource Planning (ERP) software. ERP software integrates into a single system various processes used to run an organization, such as finance, manufacturing, human resources, supply chain, services, procurement, and others. These processes typically provide intelligence, visibility, and efficiency across most if not all aspects of an organization. One Example of ERP software is SAP® S/4 HANA from SAP SE of Walldorf, Germany.

More particularly, the data retrieved from the user system 112 may include data from one or more base tables 114 in the user system 112. A base table (also known as a system base table or system table), is an underlying table that stores metadata for a specific database. In SAP® S/4 HANA, a base table is called ACDOCA.

For illustrative purposes, FIG. 1 depicts the one or more base tables 114 as being copied over from the user system 112 into a repository 116 in the existing version processing component 104. It should be recognized, however, that this may or may not occur in implementation. In other words, in some example embodiments, the existing version processing component 104 is able to work directly from the one or more base tables 114 in the user system 112 without needing to copy them and store them locally in a repository 116. In addition to the one or more base tables 114, the existing version processing component 104 may also access (and possibly copy) one or more data tables 118 from the user system 112. These may, in some example embodiments, also be stored in repository 116.

The existing version processing component 104 is then able to execute the one or more processes on the data from the one or data tables 118, using the one or more base tables 114. The GUI 108 may also then display the results of this execution, such as in a left side of a screen dedicated to running execution of the existing version of the software product.

A machine learning model 120 then takes as input the one or more data tables 118, the one or more base tables 114, and the one or more processes, and may construct a virtual table 122 in a repository 123 of the target version processing component 106. The virtual table 122 includes dynamically obtained values from the one or more data tables 118 from the user system 112. In an example embodiment, the virtual table does not store the values themselves, but rather stores links to appropriate fields of the one or more tables in the user system 112 directly, so that the most up-to-date values for the respective fields can be obtained, when needed, from the user system directly. It should be noted that the same is true of the existing version processing component 104, except its local copy of the one or more base tables 114 is not virtual, in that it will not be deleted if the application is closed.

A technical issue arises in that oftentimes a newer version of a software product may have a process that utilizes additional data fields, such as additional columns of a table, than was used in an existing version of the software product. Here, for example, one or more data tables 118 is depicted as a table containing columns X, Y, and Z, which may all be used by a particular process of interest in the existing version of the software product. The target version of the software product, however, may utilize columns A and B (which are missing from the one or more data tables 118), as well as columns X, Y, and Z (which are not missing from the one or more data tables). As such, the machine learning model 120 acts to determine that these additional columns of data are needed, and constructs values for the additional columns automatically, despite them not being present in the one or more data tables 118.

This is performed by the machine learning model 120 accessing information about the target version of the software product from repository 116. This information may include, for example, schema information and other information that can inform the machine learning model 120 of which fields of data the one or more processes of interest utilize in the target version of the software product. The machine learning model 120 then compares these fields to the fields already present in the one or more data tables 118, which were passed to the machine learning model 120 as input. It then knows which fields have data that it is able to obtain from the one or more data tables 118 and which fields need to have data created for it. The machine learning model 120 then creates the data it needs to create, dynamically obtains the data it can obtain, and then constructs virtual table 122 containing both the data it was able to obtain and the data it needed to create.

The target version processing component 106 is then able to execute the one or more processes on the data from the virtual table 122. The GUI 108 may also then display the results of this execution, such as in a right side of a screen dedicated to running execution of the target version of the software product.

The machine learning model 120 may be trained using a first machine learning algorithm 124. In an example embodiment, the first machine learning algorithm 124 may iterate among various weights (which are the parameters) that will be multiplied by various input variables and evaluate a loss function at each iteration, until the loss function is minimized, at which stage the weights/parameters for that stage are learned. Specifically, the weights are multiplied by the input variables as part of a weighted sum operation, and the weighted sum operation is used by the loss function.

The first machine learning algorithm 124 may be selected from among many other different potential supervised or unsupervised machine learning algorithms. Examples of supervised learning algorithms include artificial neural networks, Bayesian networks, instance-based learning, support vector machines, linear classifiers, quadratic classifiers, k-nearest neighbor, decision trees, and hidden Markov models.

The training data may include system transactions, application program interface (API) function modules, any current process of the existing version of the software product, and the underlying files utilized. The system transactions allow the machine learning model 120 to be trained to recognize system activity dynamically. This training data may include data from multiple different user systems 112. In that way, for example, the machine learning model 120 can be trained to predict values for fields that are missing from the one or more data tables 118 based on values many user systems 112 have entered or utilized for those fields. The machine learning model 120 may be trained using several versions and recognizes the system activity dynamically.

Additionally, as the user continues to work the system 100, the user's transactions and other usage information is tracked and used to retrain the machine learning model 120. This may be tracked by a usage tracker 126 within the GUI 108 that receives the user activity and tracks it.

In an example embodiment, a highlighter 128 within the GUI 108 may further act to, as described earlier, highlight the differences between the existing version of the software product and the target version of the software product. The highlighter 128 may include a toolset 130 for highlighting those different aspects, options and graph libraries 132 that contain various options and graphs that can be used for the highlighting, and a workflow maintainer 134. The workflow maintainer 134 may work to maintain the workflow of the existing version of the software product when rendering the workflow of the target version of the software product. Workflow in this case refers to the user interface workflow, such as the orientation of user interface elements such as buttons. For example, an existing version of the software product may lay out buttons horizontally, whereas a target version of the software product may lay out buttons vertically. This can be confusing for a user, especially if those buttons are otherwise identical and perform the same functions, and make it more difficult for a user to discern substantive differences between the existing version of the software product and the target version of the software product. The workflow maintainer 134 may therefore reconfigure the workflow of the target version of the software product to match the workflow of the existing version of the software product, at least for non-substantive differences in the workflow. This action, however, is optional, as some users may view the alteration of workflow as more substantive and may actually want to see those differences, if not have them highlighted as well.

It should be noted that the GUI 108 may be designed to display some sort of notice to the user that the right side of the display is pending calculations, as in some instances there may be a noticeable delay as the machine learning model 120 creates the data, and the target version processing component 106 is then able to execute the one or more processes on the data from the virtual table 122. This notice may include, for example, a "busy indicator" or the like.

In some example embodiments, a lightweight code base 126 is used to maintain the code repository and render code logics of the graphical user interface 108 for target versions, plus seamlessly adapt with the machine learning model 120, existing version, workflow maintainer 134, highlighter, and usage tracker 126.

Figure 2:
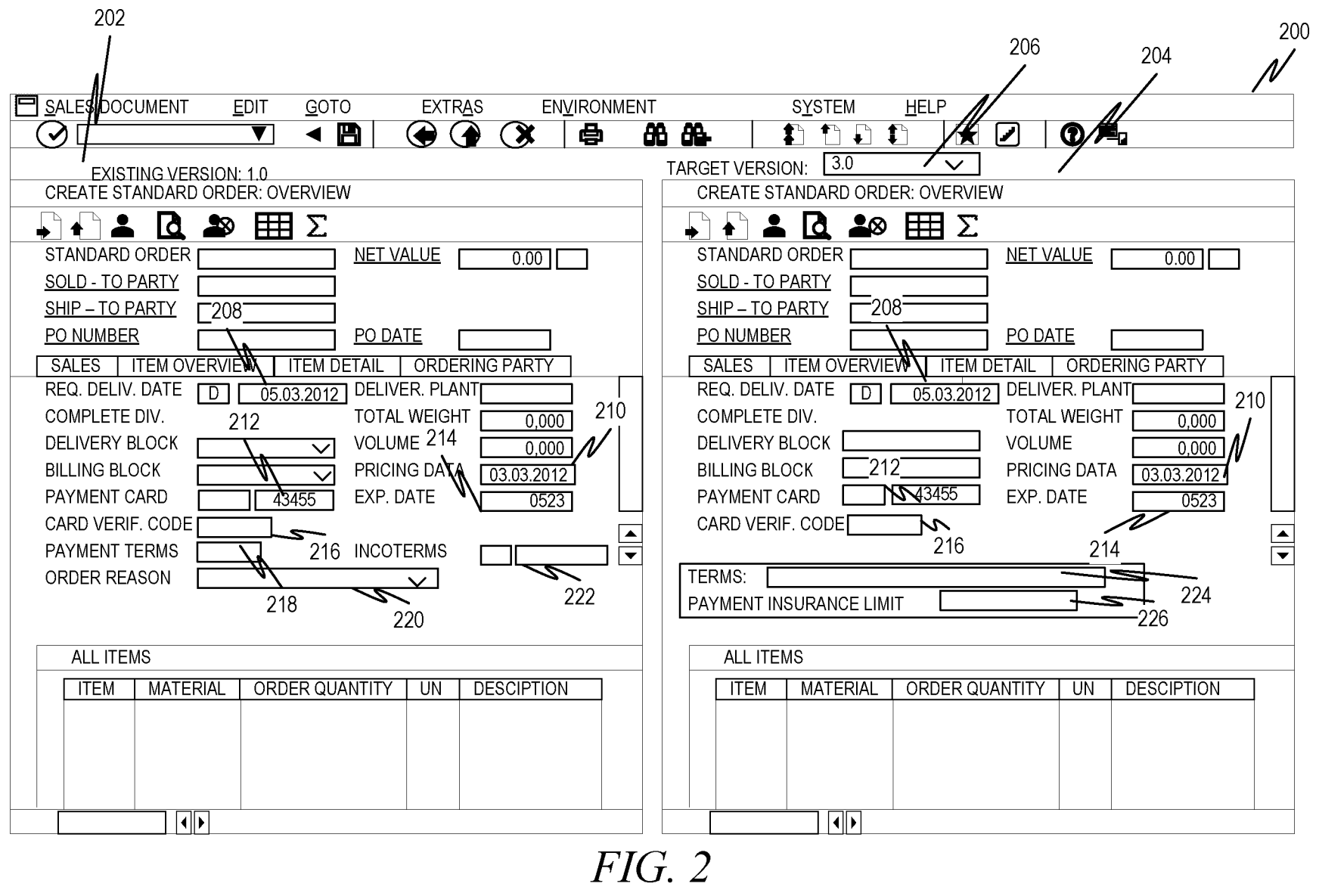

FIG. 2 is an example depicting a screen 200 of a GUI, in accordance with an example embodiment. The screen 200 may be rendered by the GUI 108 of FIG. 1. As described above, the screen 200 may be divided into an existing version portion 202 and a target version portion 204. Here, the existing version portion 202 is shown as being on the left side of the screen 200, while the target version portion 204 is shown as being on the right side of the screen 200, although this ordering and orientation is not mandatory.

Here, the two portions depicts a workflow, and in particular a "Create standard order: overview" portion of a workflow. The existing version portion 202 depicts this workflow using version 1.0 of the software product, while the target version portion 204 depicts this workflow using version 3.0 of the software product, as the user has selected version 3.0 in the drop-down user interface element 206.

In both versions. some of the fields, such as fields 208, 210, 212, 214, and 216 have been prepopulated with default values and/or values from the user system's data tables. For example, fields 212, 214, and 216 are filled in with the user's credit card information.

Some of the fields, however, are different in the target version than in the existing version. Fields 218, 220, and 222, for example, are present in the existing version portion 202 but have replaced with fields 224 and 226 in the target version portion 204, because those aspects have changed from version 1.0 to version 3.0. Additionally, fields 224 and 226 contain data that is generated by the machine learning model, since it was not present in the data tables of the user system. This allows the user to not only see the changes that have occurred in the workflow from version 1.0 to version 3.0, but allows the user to see samples of how the target version will interface with his or her data.

Figure 3:
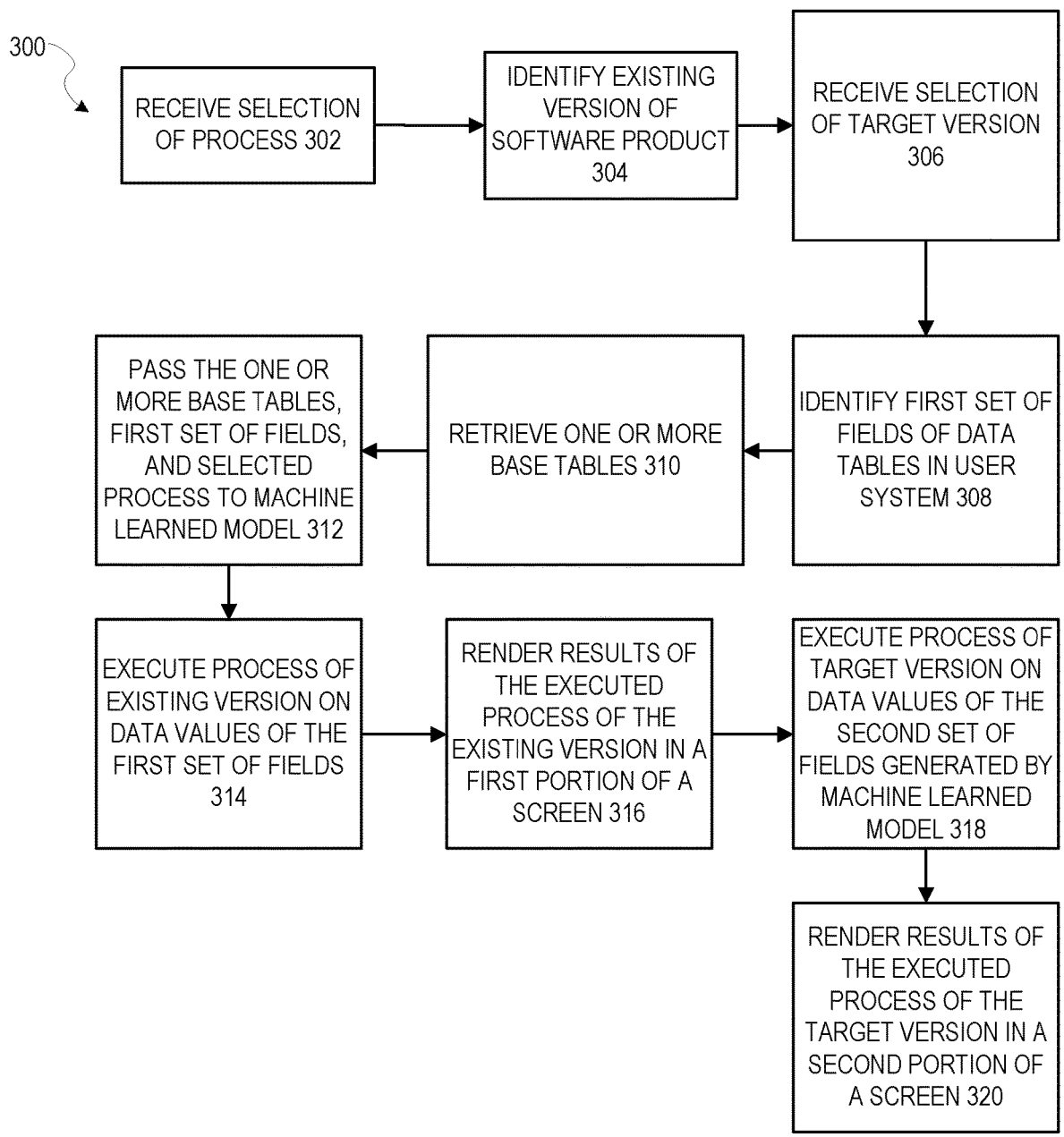
FIG. 3 is a flow diagram illustrating a method, in accordance with an example embodiment.

FIG. 3 is a flow diagram illustrating a method 300, in accordance with an example embodiment. At operation 302, a selection of a process of a software product to execute in a software version comparison tool is received. This selection may be, for example, received via a drop-down user interface element in a GUI. At operation 304, an existing version of the software product is identified. This may be identified, for example, from one or more base tables of a user system. At operation 306, a selection of a target version of the software product is received.

At operation 308, a first set of fields of data tables in a user system that contain data used by the process in the existing version is identified. At operation 310, one or more base tables are retrieved from the user system. At operation 312. the one or more base tables, the first set of fields, and the selection of the process are passed to a machine learning model. The machine learning model identifies a second set of fields that are used by the process in the target version but that are not present in the data tables in the user system, automatically generates data values for the second set of fields. and automatically constructs a virtual table containing current data values for the first set of fields, extracted from the user system, and the generated data values for the second set of fields.

At operation 314, the process of the existing version is executed on data values of the first set of fields. At operation 316, results of the executed process of the existing version are rendered in a first portion of a screen of a GUI. At operation 318, the process of the target version is executed on data values of the second set of fields. At operation 320, results of the executed process of the target version are rendered in a second portion of a screen of a GUI.

In view of the above-described implementations of subject matter, this application discloses the following list of examples, wherein one feature of an example in isolation or more than one feature of said example taken in combination and, optionally, in combination with one or more features of one or more further examples are further examples also falling within the disclosure of this application:

Example 1. A system comprising:
  at least one hardware processor; and
  a computer-readable medium storing instructions that, when executed by the at least one hardware processor, cause the at least one hardware processor to perform operations comprising:
  identifying an existing version of a software product and a selection of a target version of the software product;
  identifying a first set of fields of data tables in a user system that contain data used by the process in the existing version;
  retrieving one or more base tables from the user system;
  passing one or more base tables, the first set of fields, and the selection of the process, to a machine learning model, the machine learning model identifying a second set of fields that are used by the process in the target version but that are not present in the data tables in the user system, automatically generating data values for the second set of fields, and automatically constructing a virtual table containing current data values for the first set of fields, extracted from the user system, and the generated data values for the second set of fields;
  executing the process of the existing version on data values of the first set of fields and the process of the target version on data values of the second set of fields; and
  rendering results of the executed process of the existing version in a first portion of a screen of a graphical user interface and results of the executed process of the target version in a second portion of the screen.

Example 2. The system of Example 1, wherein the existing version is identified from one or more base tables in the user system.

Example 3. The system of Example 1 or 2, wherein the one or more base tables are system tables in the user system.

Example 4. The system of any of Examples 1-3, wherein the user system is an ERP system.

Example 5. The system of any of Examples 1-4, wherein the receiving a selection is received via a drop-down menu in the screen of the GUI.

Example 6. The system of any of Examples 1-5, wherein the machine learning model is trained by a machine learning algorithm by passing training data into the machine learning algorithm, the training data including system transactions, API function modules, and any current process of the existing version of the software product.

Example 7. The system of any of Examples 1-6, wherein the virtual table is deleted upon closing of the software version comparison tool.

Example 8. A method comprising:
  identifying an existing version of a software product and a selection of a target version of the software product;
  identifying a first set of fields of data tables in a user system that contain data used by the process in the existing version;
  retrieving one or more base tables from the user system;
  passing one or more base tables, the first set of fields, and the selection of the process, to a machine learning model, the machine learning model identifying a second set of fields that are used by the process in the target version but that are not present in the data tables in the user system, automatically generating data values for the second set of fields, and automatically constructing a virtual table containing current data values for the first set of fields, extracted from the user system, and the generated data values for the second set of fields;
  executing the process of the existing version on data values of the first set of fields and the process of the target version on data values of the second set of fields; and
  rendering results of the executed process of the existing version in a first portion of a screen of a graphical user interface and results of the executed process of the target version in a second portion of the screen.

Example 9. The method of Example 8, wherein the existing version is identified from one or more base tables in the user system.

Example 10. The method of Example 8 or 9, wherein the one or more base tables are system tables in the user system.

Example 11. The method of any of Examples 8-10, wherein the user system is an ERP system.

Example 12. The method of any of Examples 8-11, wherein the receiving a selection is received via a drop-down menu in the screen of the GUI.

Example 13. The method of any of Examples 8-12, wherein the machine learning model is trained by a machine learning algorithm by passing training data into the machine learning algorithm, the training data including system transactions, API function modules, and any current process of the existing version of the software product.

Example 14. The method of any of Examples 8-13, wherein the virtual table is deleted upon closing of the software version comparison tool.

Example 15. A non-transitory machine-readable medium storing instructions which, when executed by one or more processors, cause the one or more processors to perform operations comprising:
  identifying an existing version of a software product and a selection of a target version of the software product;
  identifying a first set of fields of data tables in a user system that contain data used by the process in the existing version;
  retrieving one or more base tables from the user system;
  passing one or more base tables, the first set of fields, and the selection of the process, to a machine learning model, the machine learning model identifying a second set of fields that are used by the process in the target version but that are not present in the data tables in the user system, automatically generating data values for the second set of fields, and automatically constructing a virtual table containing current data values for the first set of fields, extracted from the user system, and the generated data values for the second set of fields; executing the process of the existing version on data values of the first set of fields and the process of the target version on data values of the second set of fields; and
  rendering results of the executed process of the existing version in a first portion of a screen of a graphical user interface and results of the executed process of the target version in a second portion of the screen.

Example 16. The non-transitory machine-readable medium of Example 15, wherein the existing version is identified from one or more base tables in the user system.

Example 17. The non-transitory machine-readable medium of Example 15 or 16, wherein the one or more base tables are system tables in the user system.

Example 18. The non-transitory machine-readable medium of any of Examples 15-17, wherein the user system is an ERP system.

Example 19. The non-transitory machine-readable medium of any of Examples 15-18, wherein the receiving a selection is received via a drop-down menu in the screen of the GUI.

Example 20. The non-transitory machine-readable medium of any of Examples 15-19, wherein the machine learning model is trained by a machine learning algorithm by passing training data into the machine learning algorithm, the training data including system transactions, API function modules, and any current process of the existing version of the software product.

Figure 4:
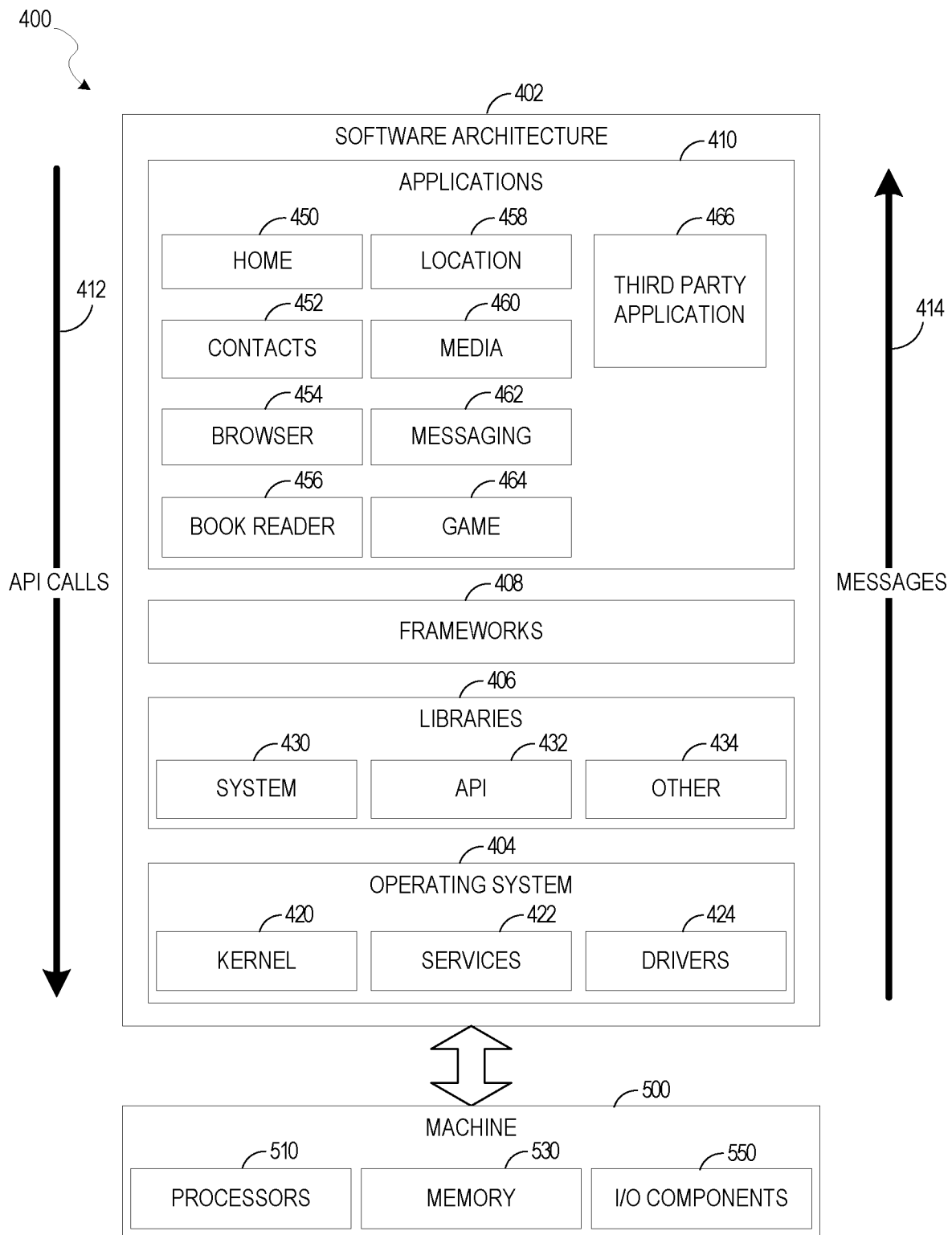
FIG. 4 is a block diagram illustrating a software architecture, which can be installed on any one or more of the devices described above.

FIG. 4 is a block diagram 400 illustrating a software architecture 402, which can be installed on any one or more of the devices described above. FIG. 4 is merely a non-limiting example of a software architecture, and it will be appreciated that many other architectures can be implemented to facilitate the functionality described herein. In various embodiments, the software architecture 402 is implemented by hardware such as a machine 500 of FIG. 5 that includes processors 510, memory 530, and input/output (I/O) components 550. In this example architecture, the software architecture 402 can be conceptualized as a stack of layers where each layer may provide a particular functionality. For example, the software architecture 402 includes layers such as an operating system 404, libraries 406, frameworks 408, and applications 410. Operationally, the applications 410 invoke API calls 412 through the software stack and receive messages 414 in response to the API calls 412, consistent with some embodiments.

In various implementations, the operating system 404 manages hardware resources and provides common services. The operating system 404 includes, for example, a kernel 420, services 422, and drivers 424. The kernel 420 acts as an abstraction layer between the hardware and the other software layers, consistent with some embodiments. For example, the kernel 420 provides memory management, processor management (e.g., scheduling), component management, networking, and security settings, among other functionality. The services 422 can provide other common services for the other software layers. The drivers 424 are responsible for controlling or interfacing with the underlying hardware. For instance, the drivers 424 can include display drivers, camera drivers, BLUETOOTH® or BLUETOOTH® Low-Energy drivers, flash memory drivers, serial communication drivers (e.g., Universal Serial Bus (USB) drivers), Wi-Fi® drivers, audio drivers, power management drivers, and so forth.

In some embodiments, the libraries 406 provide a low-level common infrastructure utilized by the applications 410. The libraries 406 can include system libraries 430 (e.g., C standard library) that can provide functions such as memory allocation functions, string manipulation functions, mathematic functions, and the like. In addition, the libraries 406 can include API libraries 432 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two-dimensional (2D) and three-dimensional (3D) in a graphic context on a display), database libraries (e.g., SQLite to provide various relational database functions), web libraries (e.g., WebKit to provide web browsing functionality), and the like. The libraries 406 can also include a wide variety of other libraries 434 to provide many other APIs to the applications 410.

The frameworks 408 provide a high-level common infrastructure that can be utilized by the applications 410. For example, the frameworks 408 provide various GUI functions, high-level resource management, high-level location services, and so forth. The frameworks 408 can provide a broad spectrum of other APIs that can be utilized by the applications 410, some of which may be specific to a particular operating system 404 or platform.

In an example embodiment, the applications 410 include a home application 450, a contacts application 452, a browser application 454, a book reader application 456, a location application 458, a media application 460, a messaging application 462, a game application 464, and a broad assortment of other applications, such as a third-party application 466. The applications 410 are programs that execute functions defined in the programs. Various programming languages can be employed to create one or more of the applications 410, structured in a variety of manners, such as object-oriented programming languages (e.g., Objective-C, Java, or C++) or procedural programming languages (e.g., C or assembly language). In a specific example, the third-party application 466 (e.g., an application developed using the ANDROID™ or IOS™ software development kit (SDK) by an entity other than the vendor of the particular platform) may be mobile software running on a mobile operating system such as IOS™, ANDROID™ WINDOWS® Phone, or another mobile operating system. In this example, the third-party application 466 can invoke the API calls 412 provided by the operating system 404 to facilitate functionality described herein.

Figure 5:
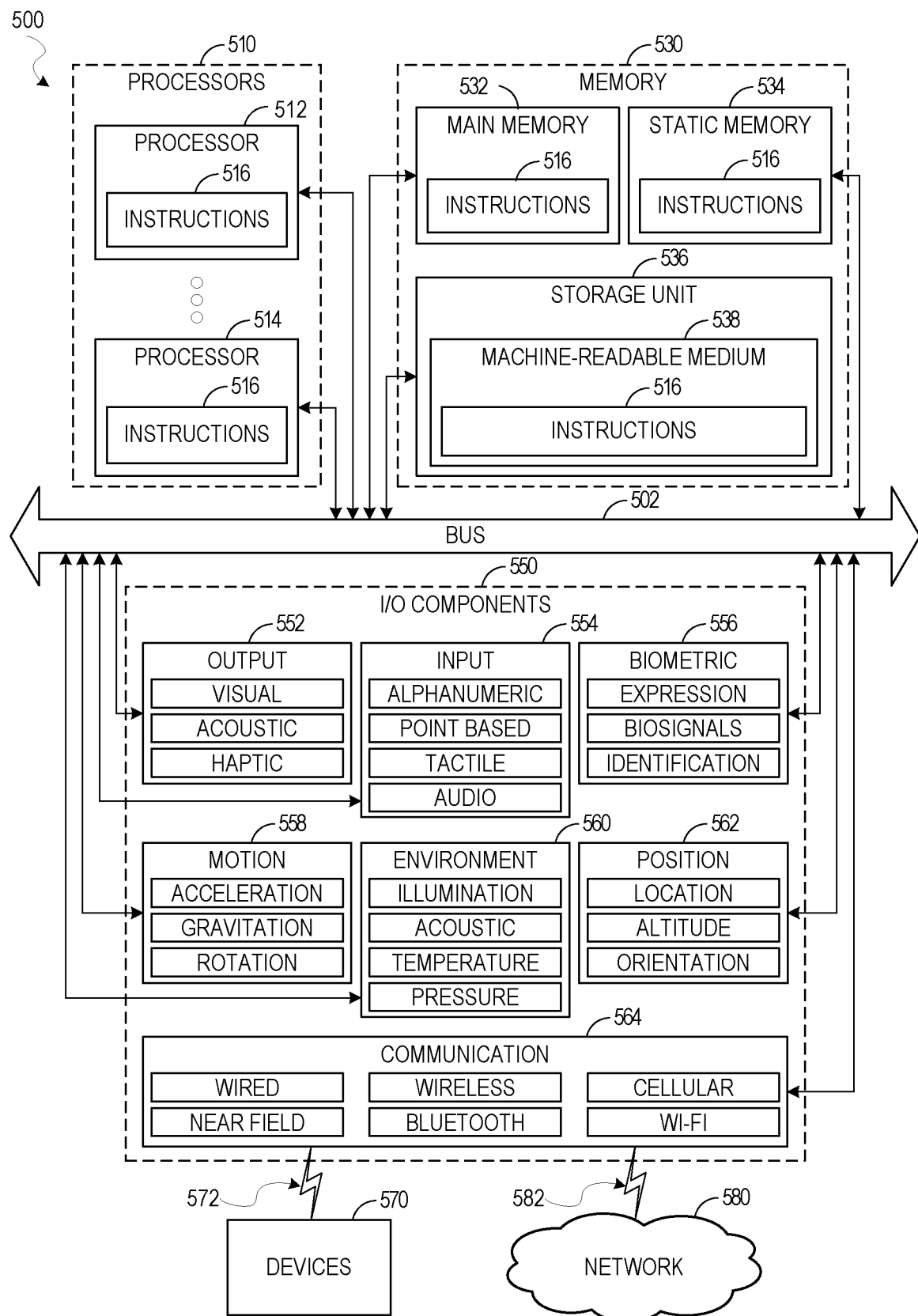
FIG. 5 illustrates a diagrammatic representation of a machine in the form of a computer system within which a set of instructions may be executed for causing the machine to perform any one or more of the methodologies discussed herein.

FIG. 5 illustrates a diagrammatic representation of a machine 500 in the form of a computer system within which a set of instructions may be executed for causing the machine 500 to perform any one or more of the methodologies discussed herein. Specifically, FIG. 5 shows a diagrammatic representation of the machine 500 in the example form of a computer system, within which instructions 516 (e.g., software, a program, an application, an applet, an app, or other executable code) for causing the machine 500 to perform any one or more of the methodologies discussed herein may be executed. For example, the instructions 516 may cause the machine 500 to execute the method of FIG. 4. Additionally, or alternatively, the instructions 516 may implement FIGS. 1-4 and so forth. The instructions 516 transform the general, non-programmed machine 500 into a particular machine 500 programmed to carry out the described and illustrated functions in the manner described. In alternative embodiments, the machine 500 operates as a standalone device or may be coupled (e.g., networked) to other machines. In a networked deployment, the machine 500 may operate in the capacity of a server machine or a client machine in a server-client network environment, or as a peer machine in a peer-to-peer (or distributed) network environment. The machine 500 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 516, sequentially or otherwise, that specify actions to be taken by the machine 500. Further, while only a single machine 500 is illustrated, the term "machine" shall also be taken to include a collection of machines 500 that individually or jointly execute the instructions 516 to perform any one or more of the methodologies discussed herein.

The machine 500 may include processors 510, memory 530, and I/O components 550, which may be configured to communicate with each other such as via a bus 502. In an example embodiment, the processors 510 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 512 and a processor 514 that may execute the instructions 516. The term "processor" is intended to include multi-core processors that may comprise two or more independent processors (sometimes referred to as "cores") that may execute instructions 516 contemporaneously. Although FIG. 5 shows multiple processors 510, the machine 500 may include a single processor 512 with a single core, a single processor 512 with multiple cores (e.g., a multi-core processor 512), multiple processors 512, 514 with a single core, multiple processors 512, 514 with multiple cores, or any combination thereof.

The memory 530 may include a main memory 532, a static memory 534, and a storage unit 536, each accessible to the processors 510 such as via the bus 502. The main memory 532, the static memory 534, and the storage unit 536 store the instructions 516 embodying any one or more of the methodologies or functions described herein. The instructions 516 may also reside, completely or partially, within the main memory 532, within the static memory 534, within the storage unit 536, within at least one of the processors 510 (e.g., within the processor's cache memory), or any suitable combination thereof, during execution thereof by the machine 500.

The I/O components 550 may include a wide variety of components to receive input, provide output, produce output, transmit information, exchange information, capture measurements, and so on. The specific I/O components 550 that are included in a particular machine will depend on the type of machine. For example, portable machines such as mobile phones will likely include a touch input device or other such input mechanisms, while a headless server machine will likely not include such a touch input device. It will be appreciated that the I/O components 550 may include many other components that are not shown in FIG. 5. The I/O components 550 are grouped according to functionality merely for simplifying the following discussion, and the grouping is in no way limiting. In various example embodiments, the I/O components 550 may include output components 552 and input components 554. The output components 552 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 554 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 550 may include biometric components 556, motion components 558, environmental components 560, or position components 562, among a wide array of other components. For example, the biometric components 556 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 558 may include acceleration sensor components (e.g., accelerometer), gravitation sensor components, rotation sensor components (e.g., gyroscope), and so forth. The environmental components 560 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 562 may include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 550 may include communication components 564 operable to couple the machine 500 to a network 580 or devices 570 via a coupling 582 and a coupling 572, respectively. For example, the communication components 564 may include a network interface component or another suitable device to interface with the network 580. In further examples, the communication components 564 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 570 may be another machine or any of a wide variety of peripheral devices (e.g., coupled via a USB).

Moreover, the communication components 564 may detect identifiers or include components operable to detect identifiers. For example, the communication components 564 may include radio-frequency identification (RFID) tag reader components, NFC smart tag detection components, optical reader components (e.g., an optical sensor to detect one-dimensional bar codes such as Universal Product Code (UPC) bar code, multi-dimensional bar codes such as QR code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 564, such as location via Internet Protocol (IP) geolocation, location via Wi-Fi® signal triangulation, location via detecting an NFC beacon signal that may indicate a particular location, and so forth.

The various memories (i.e., 530, 532, 534, and/or memory of the processor(s) 510) and/or the storage unit 536 may store one or more sets of instructions 516 and data structures (e.g., software) embodying or utilized by any one or more of the methodologies or functions described herein. These instructions (e.g., the instructions 516), when executed by the processor(s) 510, cause various operations to implement the disclosed embodiments.

As used herein, the terms "machine-storage medium," "device-storage medium," and "computer-storage medium" mean the same thing and may be used interchangeably. The terms refer to single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate array (FPGA), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various example embodiments, one or more portions of the network 580 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 580 or a portion of the network 580 may include a wireless or cellular network, and the coupling 582 may be a Code Division Multiple Access (CDMA) connection, a Global System for Mobile communications (GSM) connection, or another type of cellular or wireless coupling. In this example, the coupling 582 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data transfer technology.

The instructions 516 may be transmitted or received over the network 580 using a transmission medium via a network interface device (e.g., a network interface component included in the communication components 564) and utilizing any one of a number of well-known transfer protocols (e.g., Hypertext Transfer Protocol (HTTP)). Similarly, the instructions 516 may be transmitted or received using a transmission medium via the coupling 572 (e.g., a peer-to-peer coupling) to the devices 570. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 516 for execution by the machine 500, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

What is claimed is:

1. A system comprising:
   at least one hardware processor; and
   a computer-readable medium storing instructions that, when executed by the at least one hardware processor, cause the at least one hardware processor to perform operations comprising:
   receiving a selection of a process to sample;
   identifying an existing version of a software product and a selection of a target version of the software product;
   identifying a first set of fields of data tables in a user system that contain data used by the process in the existing version;
   retrieving one or more base tables from the user system;
   passing the one or more base tables, the first set of fields, and the selection of the process to a machine learning model, the machine learning model identifying a second set of fields that are used by the process in the target version but that are not present in the data tables in the user system, automatically generating data values for the second set of fields, and automatically constructing a virtual table containing current data values for the first set of fields, extracted from the user system, and the generated data values for the second set of fields;
   executing the process of the existing version on data values of the first set of fields and the process of the target version on data values of the second set of fields; and
   rendering results of the executed process of the existing version in a first portion of a screen of a graphical user interface and results of the executed process of the target version in a second portion of the screen.

2. The system of claim 1, wherein the existing version is identified from one or more base tables in the user system.

3. The system of claim 1, wherein the one or more base tables are system tables in the user system.

4. The system of claim 1, wherein the user system is an Enterprise Resource Planning (ERP) system.

5. The system of claim 1, wherein the receiving a selection is received via a drop-down menu in the screen of the graphical user interface.

6. The system of claim 1, wherein the machine learning model is trained by a machine learning algorithm by passing training data into the machine learning algorithm, the training data including system transactions, application program interface (API) function modules, and any current process of the existing version of the software product.

7. The system of claim 1, wherein the virtual table is deleted upon closing of a software version comparison tool.

8. A computer-implemented method comprising:
receiving, by a hardware processor, a selection of a process to sample;
identifying, by the hardware processor, an existing version of a software product and a selection of a target version of the software product;
identifying, by the hardware processor, a first set of fields of data tables in a user system that contain data used by the process in the existing version;
retrieving, by the hardware processor, one or more base tables from the user system;
passing the one or more base tables, the first set of fields, and the selection of the process to a machine learning model, the machine learning model identifying a second set of fields that are used by the process in the target version but that are not present in the data tables in the user system, automatically generating data values for the second set of fields, and automatically constructing a virtual table containing current data values for the first set of fields, extracted from the user system, and the generated data values for the second set of fields;
executing, by the hardware processor, the process of the existing version on data values of the first set of fields and the process of the target version on data values of the second set of fields; and
rendering results of the executed process of the existing version in a first portion of a screen of a graphical user interface and results of the executed process of the target version in a second portion of the screen.

9. The computer-implemented method of claim 8, wherein the existing version is identified from one or more base tables in the user system.

10. The computer-implemented method of claim 8, wherein the one or more base tables are system tables in the user system.

11. The computer-implemented method of claim 8, wherein the user system is an Enterprise Resource Planning (ERP) system.

12. The computer-implemented method of claim 8, wherein the receiving a selection is received via a drop-down menu in the screen of the graphical user interface.

13. The computer-implemented method of claim 8, wherein the machine learning model is trained by a machine learning algorithm by passing training data into the machine learning algorithm, the training data including system transactions, application program interface (API) function modules, and any current process of the existing version of the software product.

14. The computer-implemented method of claim 8, wherein the virtual table is deleted upon closing of a software version comparison tool.

15. A non-transitory machine-readable medium storing instructions which, when executed by one or more processors, cause the one or more processors to perform operations comprising:
receiving a selection of a process to sample;
identifying an existing version of a software product and a selection of a target version of the software product;
identifying a first set of fields of data tables in a user system that contain data used by the process in the existing version;
retrieving one or more base tables from the user system;
passing the one or more base tables, the first set of fields, and the selection of the process to a machine learning model, the machine learning model identifying a second set of fields that are used by the process in the target version but that are not present in the data tables in the user system, automatically generating data values for the second set of fields, and automatically constructing a virtual table containing current data values for the first set of fields, extracted from the user system, and the generated data values for the second set of fields;
executing the process of the existing version on data values of the first set of fields and the process of the target version on data values of the second set of fields; and
rendering results of the executed process of the existing version in a first portion of a screen of a graphical user interface and results of the executed process of the target version in a second portion of the screen.

16. The non-transitory machine-readable medium of claim 15, wherein the existing version is identified from one or more base tables in the user system.

17. The non-transitory machine-readable medium of claim 15, wherein the one or more base tables are system tables in the user system.

18. The non-transitory machine-readable medium of claim 15, wherein the user system is an Enterprise Resource Planning (ERP) system.

19. The non-transitory machine-readable medium of claim 15, wherein the receiving a selection is received via a drop-down menu in the screen of the graphical user interface.

20. The non-transitory machine-readable medium of claim 15, wherein the machine learning model is trained by a machine learning algorithm by passing training data into the machine learning algorithm, the training data including system transactions, application program interface (API) function modules, and any current process of the existing version of the software product.

* * * * *